United States Patent

[11] 3,603,528

| [72] | Inventors | Charles R. Kingsley;<br>John C. Kohler; Robert P. Lehmann;<br>Lawrence A. Ulmschneider, all of<br>Rochester, N.Y. |
|---|---|---|
| [21] | Appl. No. | 805,519 |
| [22] | Filed | Mar. 10, 1969 |
| [45] | Patented | Sept. 7, 1971 |
| [73] | Assignee | Eastman Kodak Company<br>Rochester, N.Y. |

[54] CASING FOR STORING A STRIP OF PHOTOGRAPHIC FILM
11 Claims, 9 Drawing Figs.

[52] U.S. Cl. .................................................. 242/197,
242/71.1, 352/75
[51] Int. Cl. .................................................. G11b23/10,
G03b 23/04
[50] Field of Search .......................................... 352/75, 78;
206/52; 242/71.1, 71, 210, 197

[56] References Cited
UNITED STATES PATENTS
2,191,849   2/1940   Debrie........................ 242/71.1
FOREIGN PATENTS
1,097,496   1/1968   Great Britain................ 242/71.1

*Primary Examiner*—George F. Mautz
*Assistant Examiner*—Milton Gerstein
*Attorneys*—Robert W. Hampton and R. Lewis Gable ABSTRACT: A casing or cartridge for storing a strip of photographic film in lighttight relationship is provided. In one illustrative embodiment the casing includes a reel with a hub about which the strip is wound and a pair of flanges, a flexible band disposed about the reel having a recess to receive the peripheral edges of the flanges, and a locking assembly for coupling the ends of the band in a manner to facilitate the relative rotation of the reel with respect to the band and to provide a lighttight passageway through which the strip may be drawn freely.

PATENTED SEP 7 1971
3,603,528
SHEET 1 OF 3
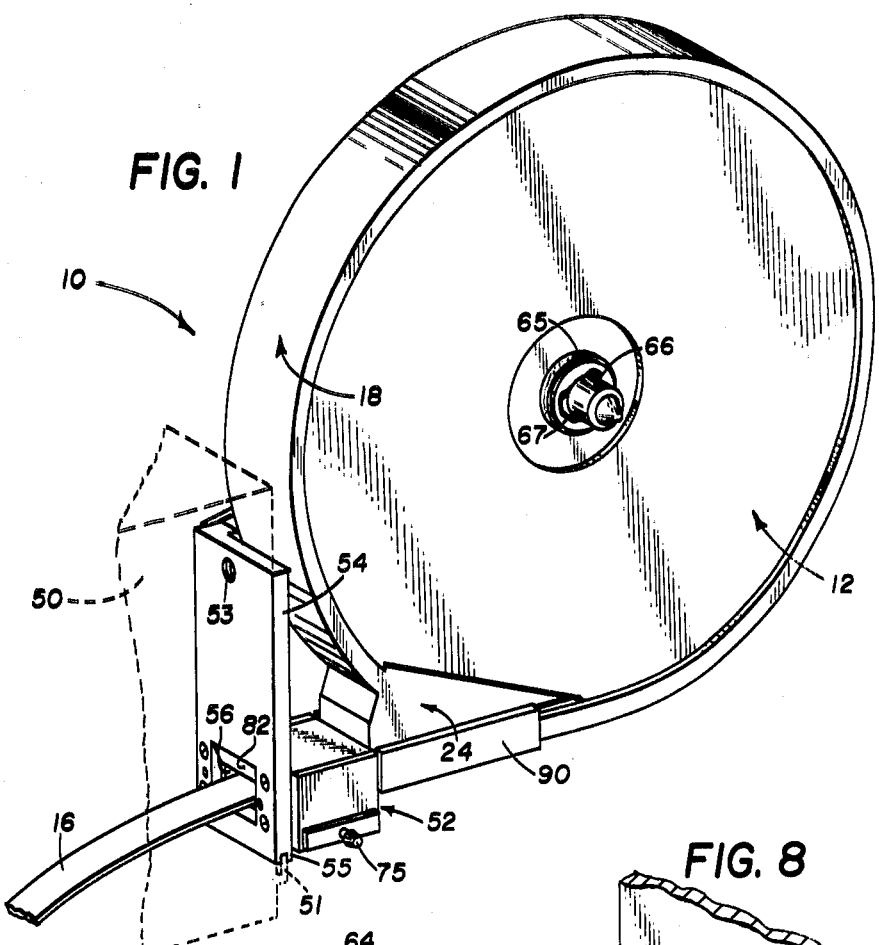
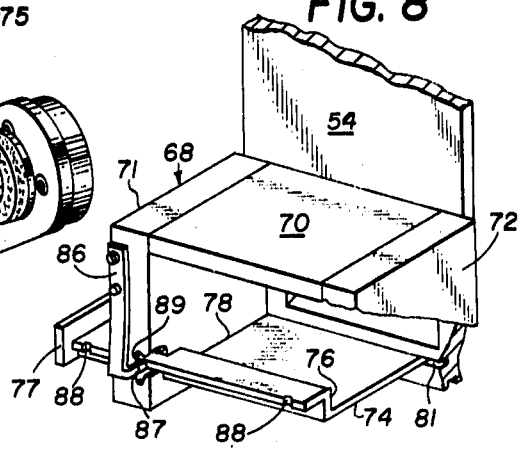
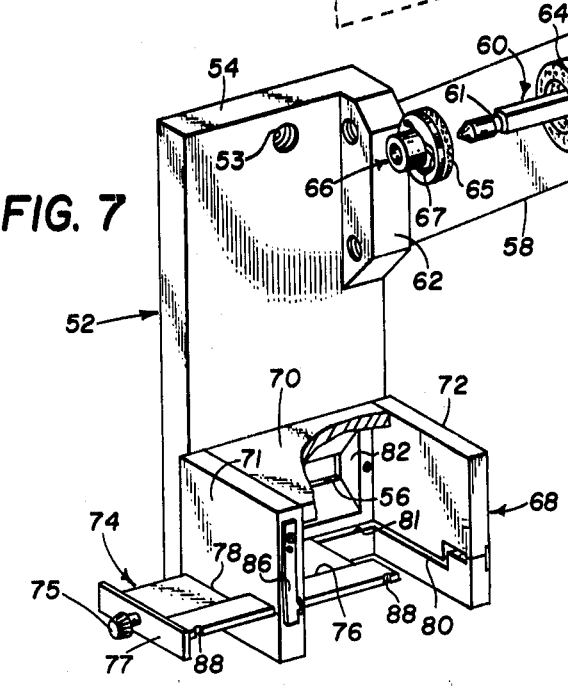
CHARLES R. KINGSLEY
JOHN C. KOHLER
ROBERT P. LEHMANN
LAWRENCE A. ULMSCHNEIDER
INVENTORS
BY R. Lewis Gable
Robert W. Hampton
ATTORNEYS CHARLES R. KINGSLEY
JOHN C. KOHLER
ROBERT P. LEHMANN
LAWRENCE A. ULMSCHNEIDER
INVENTORS BY R. Lewis Dahle
Robert W. Hampton
ATTORNEYS

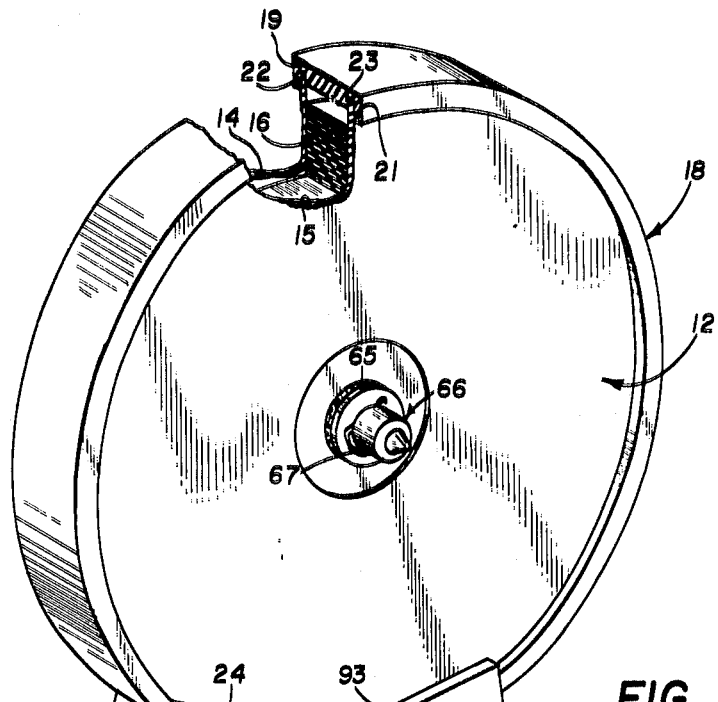
FIG. 6
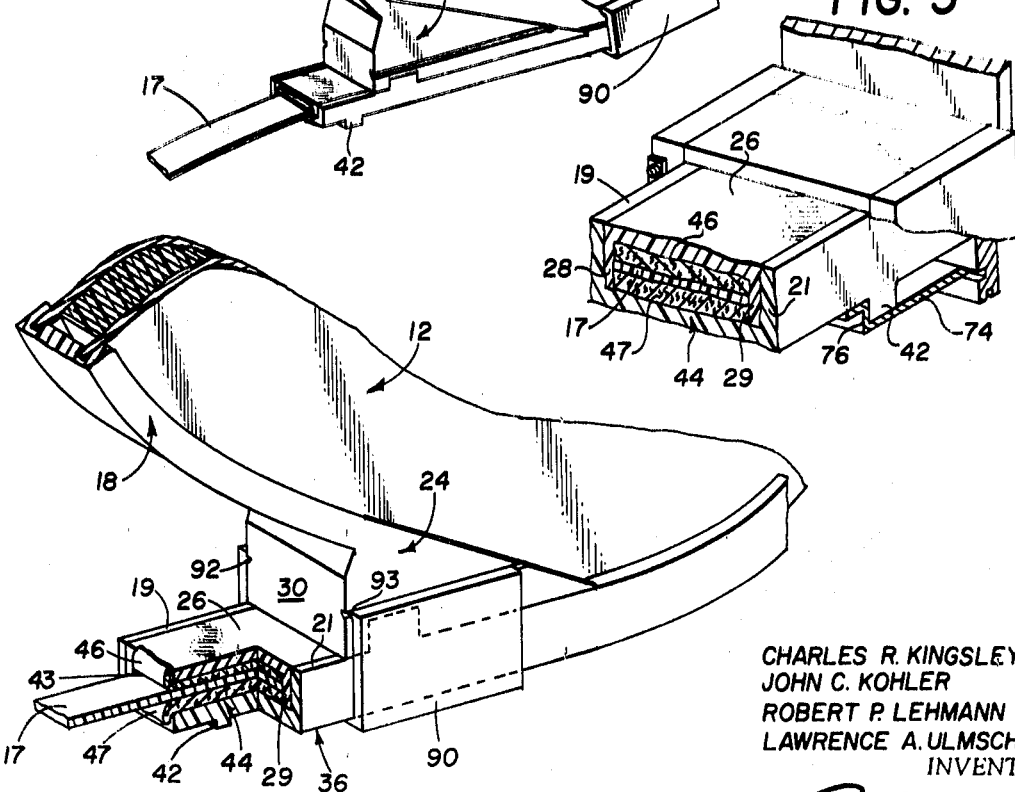
FIG. 5
FIG. 4
CHARLES R. KINGSLEY
JOHN C. KOHLER
ROBERT P. LEHMANN
LAWRENCE A. ULMSCHNEIDER
INVENTORS
BY *R. Lewis Dahl*
*Robert W. Hampton*
ATTORNEYS 3,603,528

CASING FOR STORING A STRIP OF PHOTOGRAPHIC FILM

BACKGROUND OF THE INVENTION

1. Field of the Invention

This invention relates to casings for receiving a strip and more particularly to such casings which are adapted to receive strips of photographic film in a lighttight manner.

2. Description of the Prior Art

The prior art has recognized the problem of handling unexposed photographic film or undeveloped, exposed photographic film without subjecting the film to ambient light. It is necessary to keep the unexposed photographic film within a lighttight casing, and to insert and withdraw the photographic film to and from a camera in a manner to prevent exposure to ambient light. Typically, unexposed photographic film is wound upon a reel or coil, which in turn is disposed within a suitable light tight package. When it is desired to load the camera, it may be necessary to withdraw the reel from the package and to load the film in the camera (or a magazine to be attached to the camera) in a darkroom under conditions of subdued light. This method of loading photographic film restricts the use of the photographic film to those places where a darkroom would be available.

There has been further suggested the use of containers for receiving and storing photographic films which are adapted to be inserted in magazines. In turn, the magazines may be loaded within the camera apparatus or attached thereto to permit the passage of the film from the magazine into the camera structure. More particularly, the lighttight container may include a casing having a lighttight opening through which the film is extracted. The casing may be inserted within a magazine and an extended length of the photographic film withdrawn through openings within the casing and the magazine to be threaded through the camera mechanism. In another example of the prior art, the casing may include a reel upon which the film is wound and a band disposed thereabout in a lighttight relationship. The casing is then inserted within a magazine; when it is desired to extract the film, a locking mechanism retaining the band about the rail is released thereby allowing the strip to be freely withdrawn from the reel. In the apparatus described above, the use of an additional magazine is required to transfer the filmstrip without exposure to ambient light from the lighttight film casing to the camera mechanism. The use of a magazine involves the additional expense of the magazine itself and the apparatus for releasing the locking mechanism.

It is therefore an object of this invention to store a strip of photographic film in a lighttight casing which is relatively inexpensive and which does not require the use of an additional magazine to adapt the casing to a camera mechanism.

It is a further object of this invention to provide a lighttight casing for photographic film which may be used after toe photographic film has been developed as a suitable means for storing the film.

SUMMARY OF THE INVENTION

These and other objects are accomplished in accordance with the teachings of this invention by providing a lighttight casing including a reel having a hub, about which a strip is wound, and a pair of flanges, a flexible band disposed about the reel and having a recess for receiving the peripheral edges of the flanges in a lighttight relation, and a coupling assembly for connecting the ends of the band together in a manner to allow the reel to be rotated freely with respect to the band and to provide a lighttight passage through which the strip may be easily drawn.

A further aspect of this invention relates to an assembly for mounting the above-described casing upon a suitable camera apparatus. In one illustrative embodiment, the mounting assembly includes an arm and a spindle for rotatably receiving the reel, and a locking means or member for receiving in a lighttight relationship the coupling assembly to allow the film to be withdrawn from the casing into the camera apparatus without exposure to ambient light.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a perspective view of the casing in accordance with the teachings of this invention and demonstrates how this casing could illustratively be mounted upon a camera apparatus;

FIG. 4 is a sectioned, perspective view of the coupling assembly of the case of FIG. 1;

FIG. 5 is a sectioned, perspective view of the lighttight seal formed by the coupling assembly of the casing shown in FIG. 1;

FIG. 6 is a perspective view of the casing shown in FIG. 1, and in particular shows how the coupling assembly forms a lighttight exit and secures the ends of the band together about the reel;

FIG. 7 shows a perspective view of the assembly for mounting the casing of FIG. 1 onto a camera apparatus; and FIG. 8 is a perspective view of the locking mechanism of the mounting assembly which is connected to the coupling assembly to provide for the lighttight withdrawal of the filmstrip from the case into the camera apparatus with parts broken away for clarity of illustration.

DESCRIPTION OF THE PREFERRED EMBODIMENTS

Figure 3:
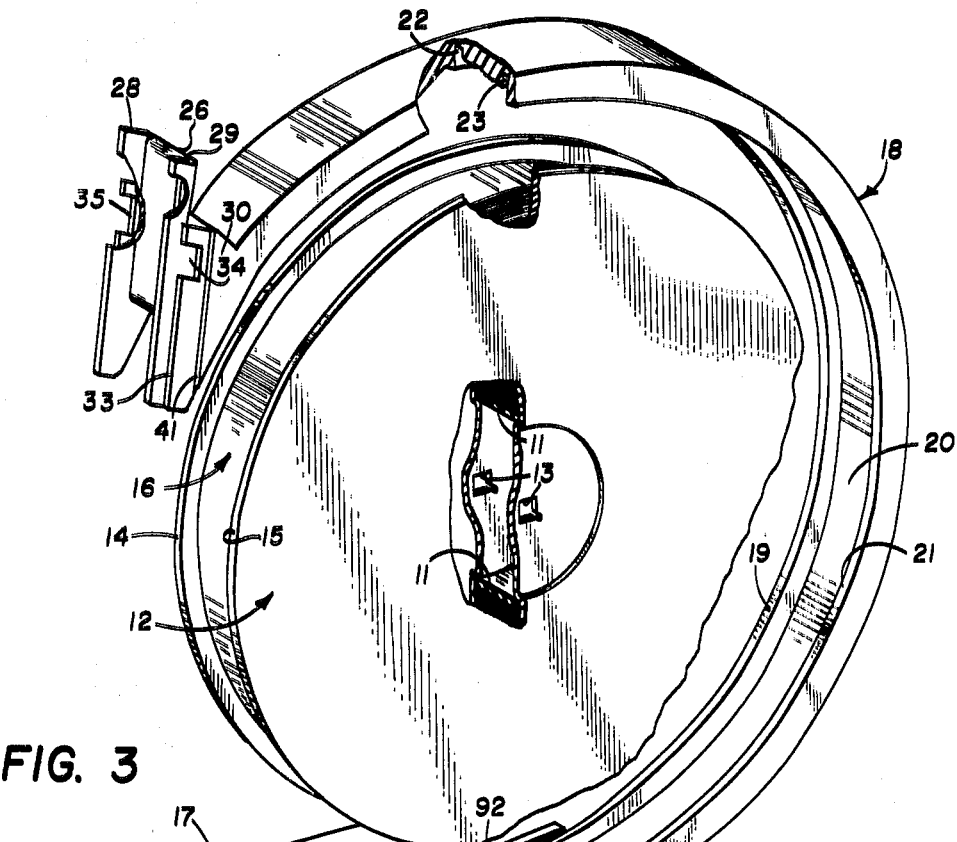
FIG. 3 is an exploded, perspective view of the casing of this invention and in particular shows how the band is disposed about the reel.

Because certain parts of photographic and related apparatus are well known, the following description is directed in particular to those elements forming, or cooperating directly with, the present invention; elements that are not specifically shown or described herein being understood to be selectable from those know in the art.

With regard to the drawings and in particular to FIG. 1, there is shown a filmstrip supply assembly 10 in accordance with the teachings of this invention. More specifically, there is shown a reel 12 for receiving and storing a strip 16 of photographic film, and a support assembly 52 for mounting the reel 12 upon a camera apparatus 50 (shown in phantom line) which would expose the strip 16 of photographic film in a manner well known in the art.

With regard to FIG. 3, the reel 12 includes a hub 11 about which the filmstrip 16 is wound, and a pair of flanges or disks 14 and 15 radially extending from the hub 11 in a substantially parallel relationship with each other. A pair of drive holes 13 are disposed centrally through the reel 12 in order to allow the reel 12 to be rotatably mounted upon the support assembly 52 as will be explained later. The reel 12 may be made of a suitable electrically conductive material such as aluminum so that the reel 12 acts as a part of a path through the support assembly 52 and the camera apparatus 50 to ground for the dissipation of static charges that may build up on the strip 16.

A band 18 made of a suitable flexible material is wrapped about the reel 12 to prevent ambient light from exposing the strip 16 of photographic film. As shown in FIG. 3, the band 18 includes a pair of flanges 19 and 21, which when the band 18 is disposed about the reel 12, extend radially inward toward the drive holes 13. The flanges 19 and 21 form a channel 20 therebetween along the entire length of the band 18. Further, the band 18 includes a pair of grooves 22 and 23 which are disposed adjacent the flanges 19 and 21, respectively. As can be seen in FIG. 6, when the band 18 is secured about the reel 12, the flanges 14 and 15 are disposed within the grooves 22 and 23, respectively, to prevent light from leaking into the reel 12.

Figure 2B:
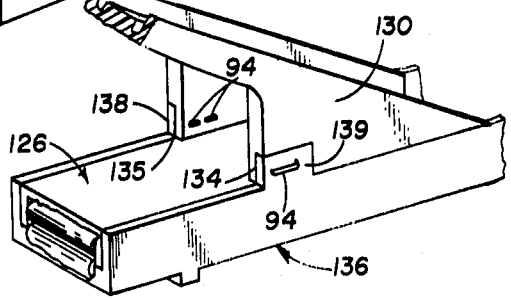
FIG. 2B is a partial, perspective view of an alternative embodiment of this invention.
Figure 2A:
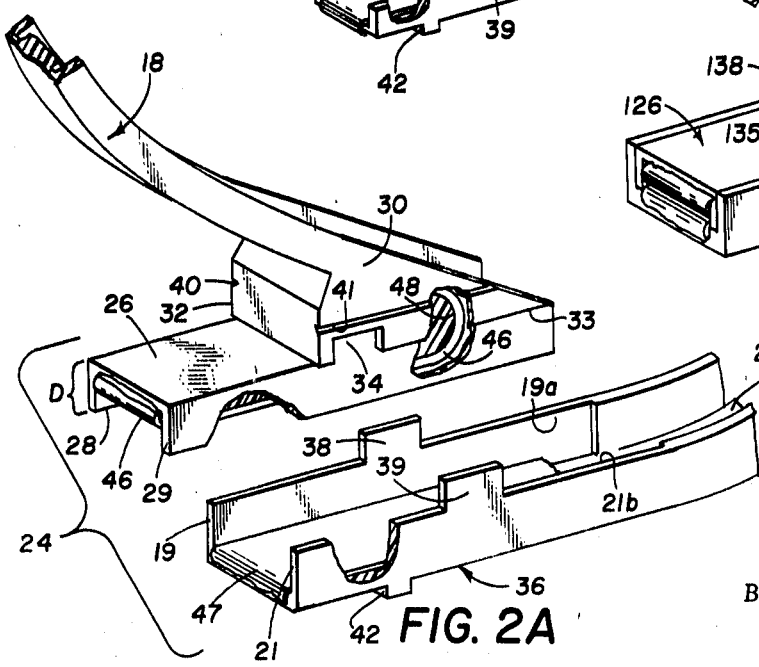
FIG. 2A is an exploded, perspective view of a coupling assembly and how it is connected together in order to form a lighttight structure in accordance with the teachings of this invention.

Referring now to FIGS. 2A and 3, there is shown a coupling assembly 24 for connecting the ends of band 18 together and to provide a lighttight passageway through which a leading end 17 of the filmstrip 16 may be withdrawn from the reel 12. The coupling assembly 24 includes a U-shaped guide member 26 which engages an extended portion 36 of the band 18 to form a passageway 43 (see FIG. 4) therebetween. The guide member 26 includes a pair of flanges 28 and 29 spaced so that they fit in tight relationship between the flanges 19 and 21 of the extended portion 36. As shown in FIG. 4, the guide member 26 is supported by a member 30 so that the passageway 43 is substantially tangential to the peripheral edges of the reel 12. Further, the support member 30 has a pair of shoulders 32 and 33 extending therefrom with a pair of recesses 34 and 35 disposed, respectively, within the shoulders 32 and 33. A pair of locking projections 38 and 39 extend from the flanges 19 and 21 of the extended portion 36 to fit tightly within the recesses 34 and 35.

As can be seen in FIG. 2A and 4, the guide member 26 may be coupled to the extended portion 36 of the band 18 by inserting the locking projections 38 and 39 into the recesses 34 and 35 (see FIG. 3). By determining the length of the band 18, the desired degree of tension is disposed upon the band 18 to allow the reel 12 to freely rotate within the band 18 and at the same time to provide a lighttight fit between the band 18 and the flanges 14 and 15 of the reel 12. In order to secure the guide member 26 to the extended portion 36, a U-shaped, locking member 90 is disposed about the band 18 as shown in FIG. 6. The support member 30 has a pair of grooves 40 and 41, respectively, which are disposed within the shoulders 32 and 33. The locking member 90 has a pair of inturned flanges 92 and 93 disposed to be received in the grooves 40 and 41. After the locking member 90 has been slid into engagement with the grooves 40 and 41 and the filmstrip supply assembly 10 may be further disposed in a suitable tight, moisture-proof package such as a foil bag for shipment to the customer.

As shown in FIGS. 2A, 4 and 5, the passageway 43 is provided through a lighttight seal 44 including first and second layers 46 and 47 of a suitable material such as plush having the properties of being resilient and of presenting a surface to the strip 16 which will not scratch the strip 16 of photographic film. The layer 46 may be secured to the guide member 26 by a suitable adhesive or by other suitable bonding methods so that one end of the layer 46 overlaps the end of the guide member 26, whereas the other end of the layer 46 is wrapped about a rounded surface 49. The layer 47 is similarly secured within the channel 20 of the extended portion 36 so that one end of the layer 47 overlaps the edge of the extended portion 36, whereas the other end extends along the extended portion 36 a distance approximately coinciding with the length of the guide member 26. A pair of recesses 19a and 21b are provided, respectively, within the flanges 19 and 21 to accommodate the guide member 26. Further, the height of the flanges 28 and 29 of the guide member 26 is shown as dimension D in FIG. 2A and is selected so that the layers 46 and 47 will abut each other with sufficient pressure to provide the desired lighttight seal therebetween and to further allow the easy withdrawal of the filmstrip 16 without marring or damaging the strip 16.

With regard to FIG. 2B, there is shown an alternative embodiment of this invention in which a guide member 126 is coupled to an extended portion 136 to form a lighttight seal therebetween without the use of a mounting member as described above. More specifically, the extended portion 136 includes a pair of upwardly extending locking projections 138 and 139 which are disposed within a pair of recesses 134 and 135 of a support member 130. The locking projections 138 and 139 are fastened within the recesses 134 and 135, respectively, by a suitable adhesive, by a suitable method of bonding or welding (e.g. ultrasonic welding), or as shown in FIG. 2B, by a pair of staples 94 which are inserted through the locking projections 138 and 139 into the support member 130.

Referring now to FIGS. 1 and 7, there is shown appropriate means for supporting the reel 12 upon camera apparatus 50 to allow the filmstrip 16 to be withdrawn from the reel 12 and fed into the camera apparatus 50. More particularly, there is shown the support assembly 52, which includes an attaching bracket 54. The attaching bracket 54 may be mounted upon the camera apparatus 50 as shown in FIG. 1 by inserting a retaining flange 51 into a groove 55 disposed within the bottom edge of the bracket 54, and by securing a suitable fastener through the aperture 53 and into the camera apparatus 50. The support assembly 52 includes an arm 58 extending at an angle from the bracket 54 to support the reel 12 as shown in FIG. 7. More particularly, the arm 58 may be secured by suitable fasteners to a shoulder 62. A spindle 60 is rotatably mounted upon the arm 58 and may be inserted through the drive holes 13 of the reel 12. A pair of gaskets 64 and 65, which are made of a suitable resilient material, are disposed about the spindle 60 to abut against the flanges 14 and 15 to thereby reduce the amount of ambient light that is passed through the drive holes 13 and the hub 11 to fog the filmstrip 16 and to help position the reel 12 for feeding the filmstrip 16 into the camera 50. The reel 12 and the gaskets 64 and 65 are fastened upon the spindle 60 by a locking plug 66. The locking plug 66 includes a resilient member 67 which snaps into a groove 61 within the spindle 60. With the reel 12 rotatably mounted on the spindle 60, the coupling assembly 24 is rotated to be releasably engaged to a lighttight locking mechanism 68. The lighttight, locking mechanism 68 includes, as shown in FIGS. 7 and 8, a top member 70 and a pair of side members 71 and 72 for receiving the coupling assembly 24. The coupling assembly 24 is locked within the mechanism 68 by a sliding member 74. More particularly, the sliding member 74 may be moved reciprocally through a slit 78 within the side member 71 and along a recess 81 within the attaching bracket 54 to be inserted finally within a recess 80 of the side member 72. The sliding member 74 further includes a side member 77 which abuts against the member 71 when the sliding member 74 is fully inserted, and a knob 75 which may be manually grasped by the operator to insert or withdraw the sliding member 74. As shown in FIG. 5, the coupling assembly 24 includes a locking ridge 42 disposed transversely of the passageway 43. The locking ridge 42 provides a surface against which a shoulder 76 of the sliding member 74 may abut to thereby secure the coupling assembly 24 within the mechanism 68. Further, one end of a flexible member 86 is secured to the side member 71 whereas the other end of the member 86 has a detent 87 extending through an aperture 89 to engage an edge of the sliding member 74. A pair of indentations 88 are disposed at either end of the leading edge of the sliding member 74 to receive the detent 87 and to thereby hold the sliding member 74 in a fully open or fully closed position.

The leading end 17 of the filmstrip 16 is withdrawn from the reel 12 through an aperture 56 within the attaching bracket 54 and into the camera apparatus 50. As seen in FIGS. 1 and 7, a plurality of beveled surfaces 82 are disposed about the aperture 56 to allow the leading end 17 to more easily pass therethrough. It is further noted that the insertion of the sliding member 74 within the recesses 80 and 81, and the abutment of the member 77 against the side member 71 serve to prevent the leakage of ambient light within the lighttight, locking mechanism 68.

Thus, there has been shown a new and improved filmstrip supply assembly including a reel for storing a strip of photographic film, a flexible band, and a coupling or film exit assembly for securing the band about the reel in a lighttight fashion and to permit the easy withdrawal of the strip without exposing it. Further, there has been shown a support assembly for mounting the reel on a camera apparatus without the need for a separate magazine and yet still providing the lighttight passage of the filmstrip from the reel into the camera apparatus. In addition, after the film has been developed, the original reel may then be still used as a dust-free storage container.

The invention has been described in detail with particular reference to preferred embodiments thereof, but it will be understood that variations and modifications can be effected within the spirit and scope of the invention.

We claim:

1. Apparatus for receiving and dispensing a strip, said apparatus comprising:
   a reel including first and second flanges each having peripheral edges, and a hub disposed between said first and second flanges for receiving the strip;
   a band disposed about said reel and having first and second ends and at least a first recess for receiving said peripheral edges of said first and said second flanges; and
   means for coupling with sufficient tension said first and second ends to enclose the strip within said first and second flanges and said band so that said reel may rotate with respect to said band, said means for coupling including means for defining a lighttight passageway through which the strip may be freely drawn.

2. Apparatus as claimed in claim 1, wherein said passageway is disposed substantially tangential to said edges.

3. Apparatus as claimed in claim 1, wherein said band includes first and second recesses for receiving, respectively, said first and second flanges of said reel, said band further including first and second flanges between which are disposed said first and second flanges of said reel to thereby prevent ambient light from leaking about said peripheral edges.

4. Apparatus as claimed in claim 1, wherein said means for coupling further comprises a guide member having first and second flanges, said band having an extended portion including first and second flanges, said guide member and said extended portion being disposed together to form said passageway between said first and second flanges of said guide member and between said first and second flanges of said extended portion.

5. Apparatus for receiving and dispensing a strip, said apparatus comprising:
   a reel including first and second flanges each having a peripheral edge, and a hub disposed between said first and second flanges for receiving the strip;
   a band disposed about said reel, and having first and second ends and at least a first recess for receiving said peripheral edges, said band having an extended portion including first and second flanges and a pair of projections; and
   means for coupling said first and second ends to enclose the strip within said first and second flanges of said reel and said band so that said reel may rotate with respect to said band, said means for coupling including a guide member having first and second flanges, said guide member and said extended portion being disposed together to form a lighttight passageway through which the strip may be directed between said first and second flanges of said guide member and between said first and second flanges of said extended portion, said guide member including a pair of recesses disposed to receive respectively said projections of said extended portion.

6. Apparatus as claimed in claim 5, wherein said guide member includes first and second grooves, and there is further included a U-shaped, locking member having first and second retaining flanges, said locking member being disposed about said extended portion with said first and second retaining flanges disposed within said first and second grooves to thereby releasably secure said extended portion to said guide member.

7. Apparatus for receiving and dispensing a strip, said apparatus comprising:
   a reel including first and second flanges each having a peripheral edge, and a hub disposed between said first and second flanges for receiving the strip;
   a band disposed about said reel, and having first and second ends and at least a first recess for receiving said peripheral edges of said first and second flanges;
   means for coupling said first and second ends for enclosing the strip within said first and second flanges and said band so that said reel may rotate with respect to said band, said means for coupling including means for defining a lighttight passageway through which the strip may be freely drawn;
   a mounting assembly comprising an arm for rotatively mounting said reel; and
   releasable means for receiving said means for coupling to prevent the rotation of said band with respect to said means to receiving.

8. Apparatus as claimed in claim 7, wherein said means for coupling includes an abutment surface, said releasable means being disposed against said abutment surface to thereby connect said means for coupling to said releasable means.

9. Apparatus as claimed in claim 8, wherein said releasable means comprises a sliding member movable from a first position in which said means for coupling may be disposed within said releasable means to a second position in which said sliding member engages said abutment surface.

10. Apparatus as claimed in claim 7, wherein a rotatable spindle is disposed upon said arm, said reel having a pair of centrally oriented holes, said spindle being disposed within said holes, and wherein there is further included first and second resilient gasket members disposed about said spindle to reduce the amount of ambient light leaking through said holes.

11. The combination of a lighttight container for receiving and dispensing a strip of photographic film and an assembly for mounting said container upon a camera apparatus, said combination including:
   a reel having first and second disks each having peripheral edges, and a hub disposed between said first and second disks for receiving the strip;
   a flexible band disposed about said reel, said band having at least one recess for receiving said peripheral edges of said disks, and first and second flanges for receiving said first and second disks therebetween to thereby reduce the leakage of ambient light about said peripheral edges;
   means for providing a lighttight passageway from said reel;
   a spindle for rotatably mounting said reel; and
   means for releasably engaging said means for providing in a lighttight relationship to facilitate withdrawal of the strip from said reel into the camera apparatus without exposing the strip to ambient light.